Oct. 26, 1965    V. J. ZUMBAHLEN    3,213,829
ANIMAL FEEDER

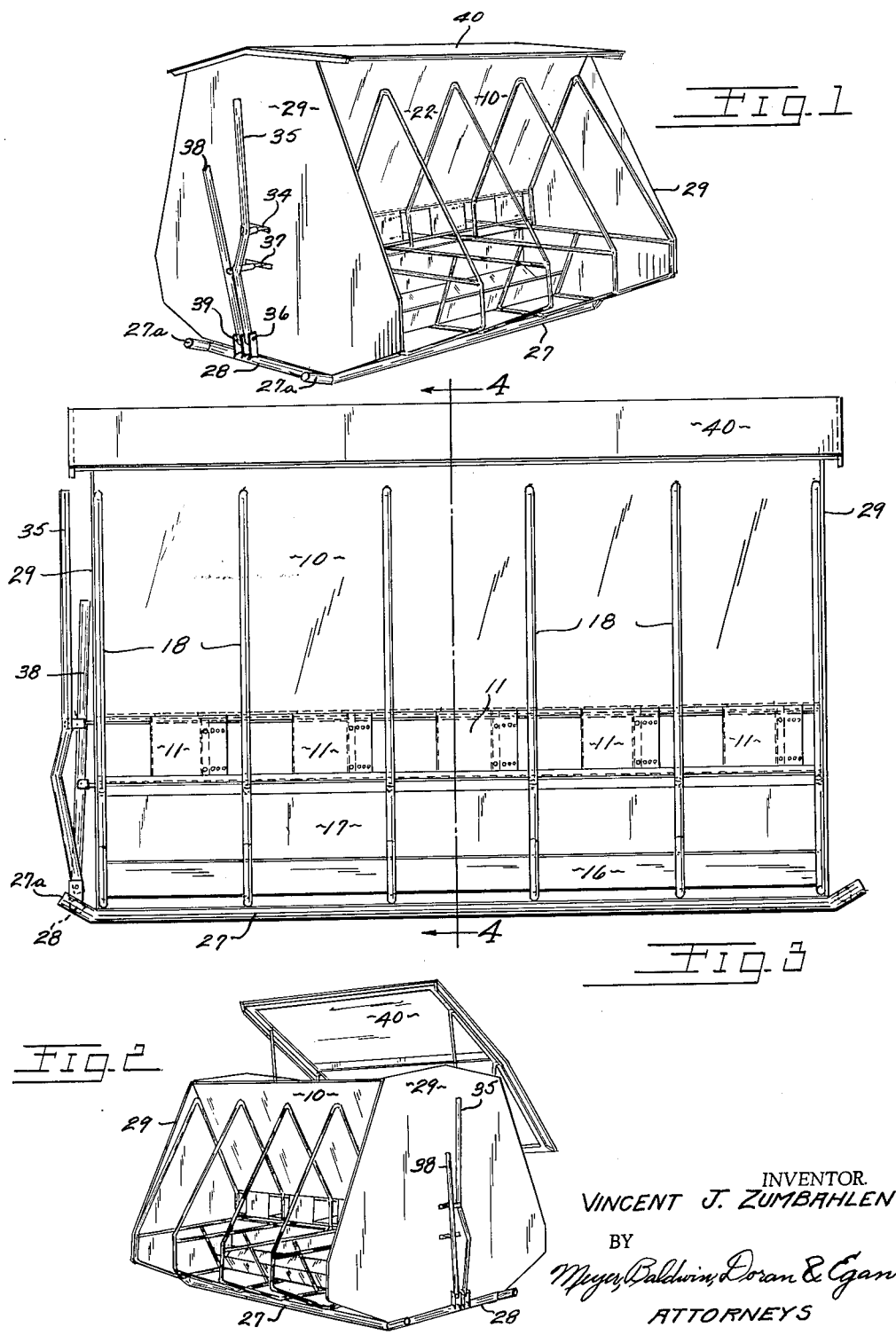

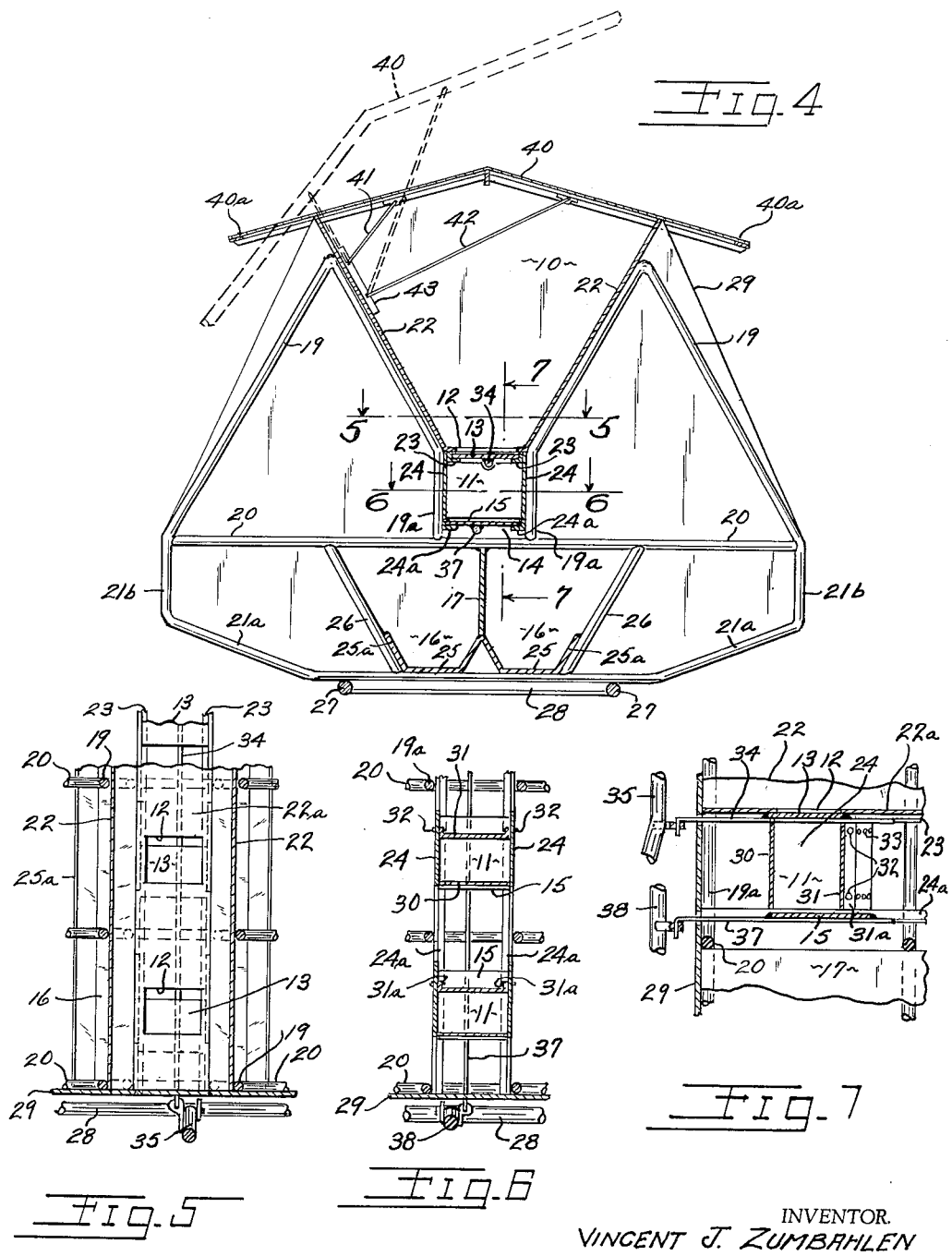

Filed Nov. 17, 1964    4 Sheets-Sheet 4

INVENTOR
VINCENT J. ZUMBAHLEN
BY
Meyer, Baldwin, Doran & Egan
ATTORNEYS

United States Patent Office 3,213,829
Patented Oct. 26, 1965

3,213,829
ANIMAL FEEDER
Vincent J. Zumbahlen, R.R. 3, Newton, Ill.
Filed Nov. 17, 1964, Ser. No. 411,923
12 Claims. (Cl. 119—56)

This application is a continuation-in-part of my co-pending application Serial No. 317,465, filed October 21, 1963, for "Animal Feeder," now abandoned.

This invention relates to improvements in animal feeders and more specifically to means for controlling the amount fed to each animal and permitting the feeding of animals without interference from the immediately adjacent animals.

One of the objects of the present invention is to provide a feed storage bin beneath which are a plurality of compartments which are adjustable in size and beneath which is trough means from which animals may feed. Gate means is provided between the bin and each compartment so that each compartment may be filled to its chosen space size and thereafter, after closing off communication with the storage bin, other gate means is opened to allow the flow of the feed into the trough means.

Another object of the present invention is to provide a novel arrangement of subframe members so positioned that they support the feeding structure and at the same time prevent the interference between adjacent animals when feeding.

Other objects of the invention reside in the design of the parts so that they efficiently carry out their functions, the details of which are set forth in the specification and the essential features whereof are set forth in the appended claims.

In the drawings:

FIG. 1 is a perspective view of one embodiment of the invention with the roof in position over the storage bin;

FIG. 2 is a smaller perspective view showing the storage bin roof in open position;

FIG. 3 is a side elevational view taken from the right-hand side of FIG. 1 and somewhat enlarged;

FIG. 4 is a sectional view taken along the line 4—4 of FIG. 3;

FIGS. 5, 6 and 7 are fragmental sectional views taken along similarly numbered lines of FIG. 4;

FIG. 8 is a front elevational view of another embodiment of this invention;

FIG. 9 is a transverse sectional view of the same taken along the line 9—9 of FIG. 8; while

Figure 9:
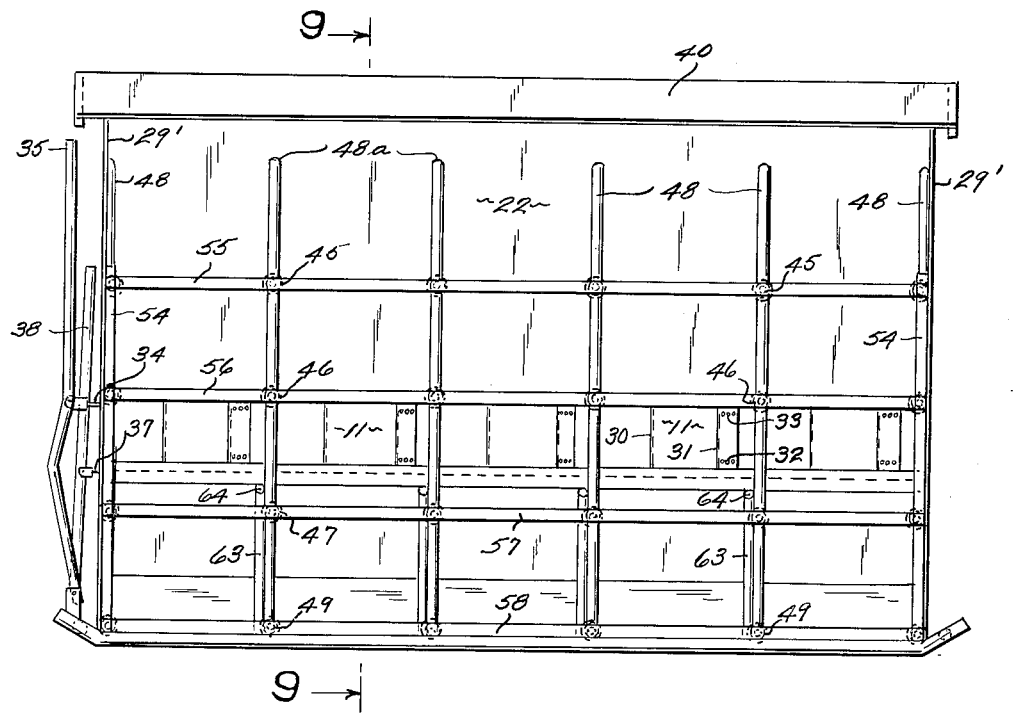

The feeding of farm animals is becoming more and more scientific, not only as to quality of feed but as to the dietary requirements to produce a given end result. Such feeds, generally commercially processed, are relatively expensive and should be used according to a fixed schedule. Such feeding cannot be accomplished unless the feed for each individual animal is fairly accurately measured, and each animal is adequately protected from interference from the other animals while feeding.

While this invention might be used for feeding various types of animal, this disclosure is particularly intended for use in feeding sow hogs. Such units are preferably made portable since the feeding area is often changed.

Referring now to the drawings, a storage bin 10 is provided supported by a framework later to be described in detail. Beneath this bin are a plurality of measuring compartments 11, each of which is located below an opening 12 in the bottom of the bin 10. Gate means 13 is provided for opening and closing the openings 12. The bottom of each compartment is open at 14 and is provided with gate means 15 for opening and closing the discharge ports 14. Beneath the measuring compartments is trough means 16 which preferably is divided into two equal troughs on opposite sides of a vertical partition 17 which is positioned centrally of the compartment 11 and discharge port 14 so as to divide the feed discharged from one of the compartments into two equal portions for hogs on opposite sides of the partition 17.

The framework is made up of a plurality of subframes 18 which are connected together by members running longitudinally of the framework so as to hold them firmly in proper position. Each subframe comprises two inverted generally V-shape members 19 having the lower ends of their legs rigidly attached to a horizontally extending member 20 which is positioned at about the height of the rump of an animal to be fed, such as a hog. Each subframe has a bottom frame member 21, the central portion of which is generally parallel to the member 20 and the outer ends of which are inclined upwardly slightly as at 21a and then bent upwardly at 21b to join the lower end of the outer legs of the frame members 19. Preferably, but not necessarily, the members 19 and 21 may be all a single piece bent as shown in FIG. 4.

The longitudinally extending members which rigidly tie together the parallel subframe members 18 are several in number. The side plates 22 of the bin 10 extend from end to end of the structure and are rigidly attached to the inner legs of the subframe members 19. This causes the sides of the bin to slope downwardly and inwardly so that the feed converges toward the compartments 11. Angle members 23 extend from end to end of the structure and are rigidly connected to the portions 19a of the frame members 19 through the medium of plate portions 24 which form the vertical sides of the compartments 11. These parts are of metal and secured together by welding usually. At the lower ends of the plates 24 they are bent inwardly to provide flanges 24a which support the gate 15 for sliding action. These members are secured to the frame portions 19a and serve to tie the subframe members together. The bottom of the trough 16 is formed by plates 25 welded to each of the frame members 21 and also to brace members 26 which are rigidly connected, as by welding, between the members 21 and 20 in position to extend alongside of the neck and shoulder portion of an animal feeding at the trough 16. These plates 25 are sloped upwardly and outwardly at their lateral edges as shown at 25a where they are attached to brace members 26. The plates 25 and partition plate 17 are rigidly secured together and the partition plate 17 is rigidly connected at its upper edge to the various subframe members 20.

Preferably, but not necessarily, skids 27 extend longitudinally of the frame in contact with the ground and with their ends turned upwardly at 27a to give a smooth skid action. A cross member 28 is provided at one end of the skids 27 for the attachment of gate operating levers as will presently be described. The skid members are rigidly secured as by welding to each of the subframe members 21.

The ends of the bins 10 are closed by end sheets or plates 29 which are rigidly secured to the outermost faces of the endmost subframe members 19 closing the ends of the bin 10 and preferably extending over the entire subframe area as indicated in FIGS. 1, 2 and 4. These end plates are preferably rigidly connected to all of the contacted surfaces on the frame members 19, 20, 21 and 26 of the endmost subframes.

Referring to FIGS. 6 and 7, the structure of each measuring compartment 11 comprises, in addition to the plates 24 previously mentioned, a fixed end plate 30 rigidly and tightly connected to the plates 24 and a movable end plate 31 having flanged ends 31a slidable snugly between the side plates 24 and held in position by bolts 32 which may pass through any one of a plurality of selected bolt openings 33 in plates 24. Thus, by sliding the end wall 31 toward the right and left in FIG. 7 the size of the measuring compartment 11 may be varied.

Referring to FIG. 5, the bottom of bin 10 is generally closed by a plate 22a in which are provided the openings 12 for flow into each of the compartments 11. The gate means 13 comprises a plurality of plates slidable along the members 23 endwise of the bin 10 and all rigidly secured to an actuating rod 34 which extends through an opening in one of the end walls 29 and is there pivotally connected to an operating lever 35 which in turn is pivotally mounted at 36 on a bracket secured to the cross member 28 of the skid structure. By pulling the lever 35 toward the left in FIG. 1 all of the plates 13 are caused to uncover the openings 12 which permits the feed to fall into the variable volume compartment 11 beneath its associated opening.

Referring to FIGS. 6 and 7, other gate means is represented by the plates 15 which slide along the flanges 24a and which are secured rigidly to an operating rod 37 which extends out an opening in the end wall 29 and is pivotally connected to an operating lever 38 which in turn is pivotally connected at 39 to a bracket held by the cross skid member 28.

The roof 40 in the full line position of FIGS. 1 and 4 completely closes the top of the bin 10 to protect the contents against the elements. Preferably also it extends at 40a partially over the feeding area so as to protect the animals from rain and the like. Preferably, the roof is hingedly supported from the structure so as to be moved to the broken line position of FIG. 4 when desired. This hinge means is here shown as links 41 and 42 pivotally connected at one end to the roof and pivotally connected at the other end to a bracket 43 rigidly secured to the side wall 22 of the bin 10.

The operation of the device will now be apparent. Feed is stored in the bin 10 and compartments 11 are adjusted by moving the wall 31 of each compartment by placing the bolts 32 in the selected openings 33. Gate means 13 is then operated by pulling the lever 35 causing each of the compartments 11 to be filled. Gate means 13 is then closed and gate means 15 is opened by utilizing the operating lever 38. This permits the feed to drop into the troughs 16, the partition 17 dividing the total discharge from each compartment 11 into two equal portions. The subframes 18 prevent each animal from interfering with an adjacent animal.

Figure 10:
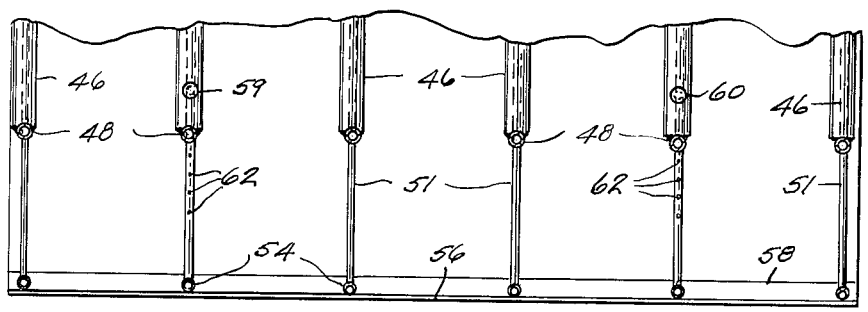
FIG. 10 is a fragmental sectional view taken along the line 10—10 of FIG. 9.
Figure 9:
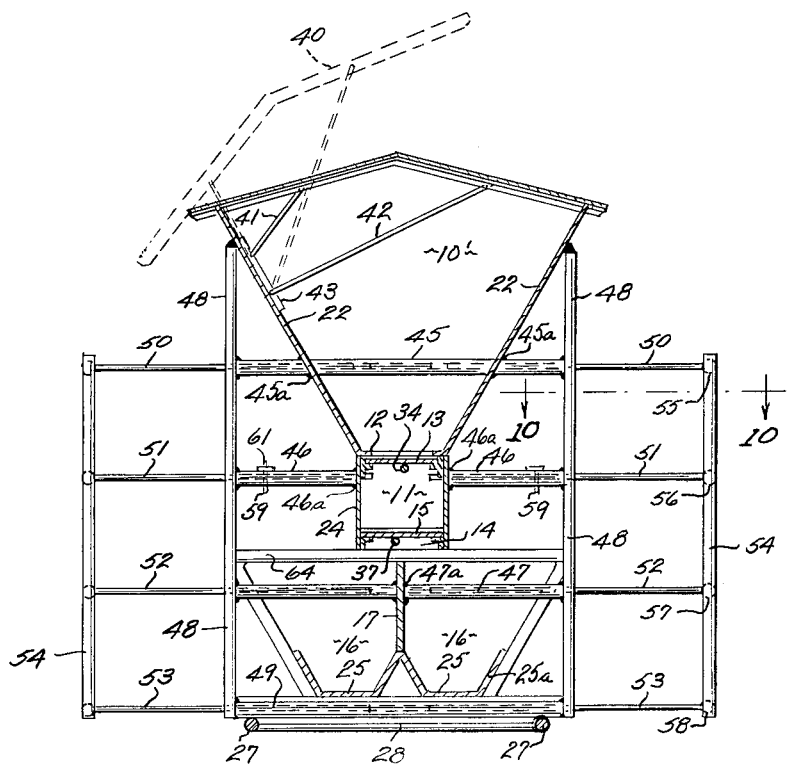

A second embodiment of this invention is shown in FIGS. 8, 9 and 10. All parts which are the same or almost exactly the same as those previously described have been given the same reference characters. This includes among other things a feed storage bin 10' having downwardly converging sides 22 closed at the ends by end walls 29' and forming a flat bottom between the walls 22 having spaced openings 12 leading down into feed measuring chambers. There is one of these chambers for each stall and they are adjustable as to size as previously described by having the movable partition 31 adjusted in the various holes 32 and 33. The flow of feed from the storage hopper 10' through openings 12 into measuring chambers 11 is by means of slide gate 13 connected with rod 34 which is controlled by lever 38 at one end of the feeder device. Flow of the feed from the measuring chamber 11 into the feed troughs 16 through discharge openings 14 is by means of a slide gate 15 fastened to control rod 37 which is manipulated by lever 38. The feed troughs are defined by members 17, 25 and 25a and the entire device moves on a bottom skid arrangement 27, 28.

The chief distinction of this second embodiment over the first embodiment is the provision of stalls adjustable as to length and where the stall partitions are completely removable from the feeder for shipping purposes, if desired. Parallel structural assemblies are provided between the stalls as shown in FIGS. 8 and 10 and each of these structural assemblies in the present embodiment comprises a plurality of parallel fixed horizontal members 45, 46 and 47 arranged in a vertical plane between each pair of stalls. In the present embodiment these fixed members are tubular members of which 45 extends through the feed hopper and is welded to the walls 22 thereof at the points 45a. The member 46 is in two parts at about the level of the upper portion of the measuring chambers 11 and are welded to vertical walls 24 of the measuring chambers at points 46a. The member 47 is at the upper level of the feed trough and may be welded to the partition 17 at points 47a, although other support for this member will be presently indicated.

The laterally outermost ends of the fixed members 45, 46 and 47 are secured as by welding to a plurality of parallel vertical tubular members 48 which are secured at their lower ends as by welding to the skid members 27 and at their upper ends at 48a are welded to the feeder bin wall 22.

Adjustable stall partitions are provided in the same vertical plane generally as the members 45, 46, 47 and 48. Each movable partition, of which there are six, is provided with a movable horizontal member such as tube or bar which telescopingly slides within each of the fixed horizontal members 45, 46, 47 previously described and a similar member 49 in vertical line with the others and located just above the bottom skid. Therefore, movable horizontal members 50, 51, 52 and 53 telescopically slide respectively in fixed horizontal members 45, 46, 47 and 49. Preferably, but not necessarily, these movable partitions are provided laterally on opposite sides of the feeder as shown in FIG. 9 and the movable members 50, 51, 52 and 53 for each movable partition meet on the center line of the feeder when the stalls are in their shortest or innermost position. Openings are provided in the members 48, 22, 24, and any other interfering members for the above mentioned sliding movement of the members 50, 51, 52 and 53.

If desired, the laterally outermost ends of all of the members 50, 51, 52 and 53 are connected by a frame comprising vertical members 54 rigidly connected by horizontal members 55, 56, 57 and 58.

Suitable means is provided for holding the stall partitions in a plurality of adjusted positions so as to vary the length of the stalls. Such an arrangement is shown at 59 and at 60, it being understood that as many of these may be provided as desired. The simple form shown here is a pin 61 passing through suitable openings in fixed member 46 and movable member 51, there being a plurality of holes 62 provided for adjustment as desired.

Referring back to the fixed member 47 and its position in the structure, a plurality of bars or tubular members 63 are welded to cross members 49 at the bottom and lie alongside the fixed members 47 and are there welded together. The fixed members 63 extend upwardly to a plurality of cross members 64 to which they are secured as by welding. These cross members support the measuring chamber structure as shown in FIGS. 8 and 9.

With the structure of the second embodiment, it is possible to quickly adjust the length of the stalls by adjustment of the pins 61 in the openings 62, or by removal of the pins the stall partitions can be completely removed from the feeder. When in position, the fit between any fixed member such as 45 and its telescoping movable member 50 is sufficiently snug to hold the partition in proper position.

What is claimed is:

1. In an animal feeder comprising a frame, a feed storage bin supported in raised position on said frame and having an elongated bottom, there being spaced openings along said bottom, first gate means operatively associated with said openings for closing and opening the same, separate adjustable compartments on said frame, each compartment communicating with an associated one of said openings, a discharge port for each said compartment, second gate means operatively associated with said discharge ports for closing and opening the same, trough means in position on said frame to receive feed from said discharge ports, and means for opening and closing said first and second gate means independently; the improvement wherein said frame comprises a plurality of open structural assemblies parallel to each other and crosswise of said trough means extending on opposite sides thereof between said compartments providing partition means, each of said assemblies including a first cross member near ground level and a second cross member generally horizontal and spaced above the ground at about the height of the body of the animal to be fed, a bottom support for said frame, said frame including members extending from the outer ends of said structural assemblies upwardly to said bin and downwardly to said bottom support, end walls secured to the end ones of said assemblies, bin side walls extending between said end walls and secured to said structural assemblies, and said bin side walls converging downwardly to the sides of said compartments.

2. In an animal feeder comprising a frame, a feed storage bin supported in raised position on said frame and having an elongated bottom, there being spaced openings along said bottom, first gate means operatively associated with said openings for closing and opening the same, separate adjustable compartments on said frame, each compartment communicating with an associated one of said openings, a discharge port for each said compartment, second gate means operatively associated with said discharge ports for closing and opening the same, trough means in position on said frame to receive feed from said discharge ports, and means for opening and closing said first and second gate means independently; the improvement wherein said frame comprises a plurality of open structural assemblies parallel to each other and crosswise of said trough means extending on opposite sides thereof, each of said assemblies including a first cross member near ground level and a second cross member generally horizontal and spaced above the ground at about the height of the body of the animal to be fed and two generally inverted V-shape members having two legs of each V-shape rigidly secured to said second cross member and members rigidly securing the outer legs of said inverted V-shape members to said cross members at about the rump position of an animal feeding from said trough, end walls secured to the end ones of said assemblies, bin side walls extending between said end walls and secured to the inner legs of said inverted V-shape members, the inner legs of said inverted V-shape members being spaced apart adjacent their connections to said second cross member, and there supporting said compartments.

3. An animal feeder as defined in claim 2, including skid members extending crosswise of, and secured to the lower surfaces of said first cross members.

4. An animal feeder as defined in claim 2, including parallel ways extending at right angles to said cross members near the top and bottom of said compartments, said first and second gate means comprising plates extending lengthwise of, and sliding upon, said ways, and said opening and closing means comprising actuators outside of said end walls and connected with said plates.

5. An animal feeder as defined in claim 2, wherein said bin is open at the top, and a roof covering said bin and hingedly connected thereto.

6. An animal feeder as defined in claim 2, including in each assembly two brace members, one each on opposite sides of said trough means, each brace member rigidly secured between said cross members approximately opposite the neck and shoulders of an animal feeding from said trough.

7. An animal feeder as defined in claim 6, wherein said trough means is secured to a plurality of said assemblies and includes a vertical partition running endwise in a plane passing centrally through said compartments.

8. An animal feeder as defined in claim 2, wherein all of said parts, except said gate means and said opening and closing means, are rigidly secured together.

9. An animal feeder as defined in claim 1 including stalls adjustable as to length, wherein said structural assemblies include a plurality of vertical rows, each row including a plurality of fixed horizontal members, a plurality of stall-forming partitions each having a vertical row of movable horizontal members adapted respectively to telescope with and lie closely adjacent to said fixed horizontal members, and adjustable fastening means for holding said movable members in varying positions relative to said fixed members whereby said partition may extend laterally away from said feeder by varying amounts.

10. An animal feeder as defined in claim 9 wherein one of said rows of members embraces the other row of telescoping members so as to firmly support said other row during telescoping sliding movement.

11. An animal feeder as defined in claim 9 wherein a stall partition frame rigidly connects all of said stall-forming partitions.

12. An animal feeder as defined in claim 9 wherein said stall-forming partitions are provided on opposite sides of said feeder.

References Cited by the Examiner

UNITED STATES PATENTS

| | | | |
|---|---|---|---|
| 208,544 | 10/78 | Smith | 119—53 |
| 608,863 | 8/98 | Innis | 119—53 |
| 901,620 | 10/08 | Jenkins | 119—56 |
| 1,061,710 | 5/13 | Webb | 119—56 |

FOREIGN PATENTS 214,078    4/24    Great Britain.

SAMUEL KOREN, *Primary Examiner.*

HUGH R. CHAMBLEE, *Examiner.*